(12) United States Patent
Irwin (10) Patent No.: US 7,467,091 B2
(45) Date of Patent: Dec. 16, 2008

(54) SYSTEM AND METHOD FOR EFFECTUATING THE CREATION AND MANAGEMENT OF CUSTOMER PICK-UP/BACKHAUL PROGRAMS BETWEEN BUYERS AND SELLERS IN A SUPPLY COMMUNITY

(75) Inventor: Charles F. Irwin, Guilford, CT (US)

(73) Assignee: IGIT, Enterprises, Inc., Guilford, CT (US)

( * ) Notice: Subject to any disclaimer, the term of this patent is extended or adjusted under 35 U.S.C. 154(b) by 965 days.

(21) Appl. No.: 10/805,512

(22) Filed: Mar. 22, 2004

(65) Prior Publication Data

US 2005/0209869 A1 Sep. 22, 2005

(51) Int. Cl.
*G06Q 10/00* (2006.01)
(52) U.S. Cl. ......................................................... 705/1
(58) Field of Classification Search ...................... 705/1
See application file for complete search history.

(56) References Cited

U.S. PATENT DOCUMENTS

| 2002/0049622 | A1* | 4/2002 | Lettich et al. ................... 705/7 |
| 2005/0278063 | A1* | 12/2005 | Hersh et al. ................... 700/216 |
| 2006/0053027 | A1* | 3/2006 | Riggs et al. ..................... 705/1 |

OTHER PUBLICATIONS

FMI/GMA Joint Industry Recommendations, "Manufacturer & Distributor Customer Pick-Up/Backhaul Fairness Statement", Oct. 2003, Joint Logistics & Distribution Committee and its Industry sponsors.*

* cited by examiner

*Primary Examiner*—John W Hayes
*Assistant Examiner*—Shannon S Saliard
(74) *Attorney, Agent, or Firm*—Dilworth IP, LLC (57) ABSTRACT

A business method and system that effectuates collaboration on Customer Pick-UP (CPU) between one or many buyers (customers) and sellers (suppliers) in a supply community. The method and system have particular utility in markets where the standard terms of sale are Destination Delivered. The method and system enables sellers to create, configure and maintain seller-specific CPU programs having at least one strategy option and at least one CPU allowance unit rate structure option which can be contemporaneously accessed by buyers to identify potential CPU opportunities and then submit a CPU proposal/request, each based on a single CPU strategy option, to one or more sellers, wherein the CPU proposal/request is a collaboration invitation, a supply bid or a request for a lane allowance quotation structured to facilitate structured to facilitate the agreement of a mutually acceptable CPU allowance unit rate consistent with the selected CPU strategy option. The system includes an internet-based program tool within which the seller can specify the rules used to select the most appropriate CPU allowance unit rate structure option for calculating the CPU shipment allowance and the seller can utilize a gainshare module to pay the buyer the agreed CPU allowance for any CPU shipments.

17 Claims, 6 Drawing Sheets

SYSTEM AND METHOD FOR EFFECTUATING THE CREATION AND MANAGEMENT OF CUSTOMER PICK-UP/BACKHAUL PROGRAMS BETWEEN BUYERS AND SELLERS IN A SUPPLY COMMUNITY

BACKGROUND OF THE INVENTION (1) Field of the Invention

The present invention relates to collaborative transportation efficiency programs between buyers and sellers in a supply community, and more particularly to a method and system for effectuating collaboration on customer pick-up opportunities.

(2) Description of the Prior Art

Business partners must collaborate to compete in today's marketplace, especially to drive growth by short-cycle innovation and to liberate the resources required to fund the growth initiatives. As buyers and sellers have increasingly focused on their core businesses and competencies, driving non-value added costs out of their supply chains has become strategic to increasing value to the buyer (and consumer) through lower prices and innovation. Many companies have restructured their supply chains—reducing assets (plant and distribution center rationalization), costs (strategic sourcing initiatives, including out-sourcing), and inventory (integrated planning systems)—to be faster, more flexible, and more efficient. Only then can the right product be introduced to the marketplace at the right time for the right cost.

The most successful companies collaborate across enterprise boundaries, avoiding sub-optimization by "drawing the box" around the extended supply chain. In particular, logistics is a functional area that is "ripe for picking" with lots of low-hanging fruit, especially in the fast-moving consumer goods (FMCG) market where logistics costs are often 5 to 10% of the selling price of the goods. One opportunity is to improve the cost-efficiency of transportation (equipment and labor) by reducing empty miles between loads ("deadhead"), maximizing trailer utilization (weigh-out or cube-out the container), and minimizing non-drive time (wait time at the location and loading/unloading times, together referred to as "dwell time"). Customer pick-up (CPU) is an approach that can contribute to all three of these objectives. First, the truck making the delivery from a customer's regional distribution center (CDC) to one of that customer's stores often runs empty from the store back to the CDC. An "in-bound" shipment from the supplier's distribution center (SDC) to the CDC can be picked-up and delivered by that customer's truck for minimal incremental cost, provided that the SDC is (essentially) en route from the customer's store to CDC. The customer truck could even make several CPU pick-ups of partial loads, thereby maximizing shipment weight or cube, provided that the route from the store to the (more than one) SDC's to the CDC is economic and the required day of shipping and pick-up appointments can be synchronized. CPU can also significantly reduce non-drive time because the CPU carrier typically has privileges to drop the loaded trailer upon arrival at the destination DC and leave immediately (rather than One opportunity is to improve the cost-efficiency of transportation (equipment wait to have the trailer unloaded). Also, when there are delays, the CPU carrier usually receives preferential treatment from the CDC.

There are, however, several barriers that must be overcome for the supplier and customer business partners to realize the maximum combined value from CPU activities.

Strategic Alignment and Relationship Management: First, the supplier and customer must agree on a single strategy prior to engaging in a CPU relationship. Insofar as the selected strategy determines the process role of each partner, failure to do so will negatively affect the quality of the business relationship. For example, is the strategy to provide the customer with Origin Collect terms of sale, or is the strategy to improve the utilization of the customer's transportation assets? If the strategy is genuinely the latter, then the role of the customer is actually the role of a supplier of transportation services. Or, perhaps the strategy is to collaborate so as to drive non-value added costs out of the extended supply chain. If so, the partners should share the savings through a gainshare program such as that described in pending patent application Ser. No. 10/775,680 filed Feb. 11, 2004 which is incorporated herein by reference and hereinafter referred to as the Gainshare Module. Both partners are rewarded for investing the resource required to develop and implement exceptional business processes. In today's CPU activities, these topics are not even considered, much less discussed and agreed upon. It is clear that a variety of strategies are available. The partners must agree on one, and only one, approach and then apply it rigorously. Unfortunately, conflicted behavior is not uncommon. For example, in the fast moving consumer goods (FMCG) market, customers espouse collaboration (share the savings), but then expect the supplier to use a CPU formula that is (essentially) "cost-neutral" for the supplier.

Discovery: The current processes available to customers for discovering attractive CPU opportunities are unworkable. It is difficult for customers to 1) determine which suppliers offer CPU programs, 2) determine which of these CPU programs have policies that would be acceptable to the customer and procedures that are feasible for the customer, 3) identify shipping locations for a candidate supplier that are logistically feasible (location, volume, and typical shipment weight or cube), and 4) agree on an allowance via the standard process of requesting a CPU allowance quotation for the shipping lanes (SDC to CDC) of interest. As a result, most customers approach CPU in a tactical manner, supported by little, if any, strategic network-wide analysis to identify the highest-value set of lanes and suppliers. A simple, expeditious discovery process would allow the simultaneous assessment of many CPU options, most likely resulting in an improved solution.

Program Complexity: No two CPU Programs are alike. For many sensible reasons, programs differ significantly in policy, procedure, and the structure of the formula used by the supplier to determine the CPU allowance. In practice, differences in policy and procedure get overlooked because enforcing compliance is so difficult. Regardless, the differences in allowance formula structure alone introduce significant complexity and confusion. The biggest difference is the basis of the CPU rate structure—is the CPU allowance rate a flat rate per purchase order or shipment (usually with a weight, cube, or pallet minimum), or is the CPU allowance determined by extending an agreed "cost per unit" rate ($ per weight, cube, or pallet) by the number of units (weight, cube, or pallet) without a minimum requirement? There are many options for the CPU rate structure, and for the other cost components, and each has its pros and cons. Predictably, confusion and anxiety are common, affecting the quality of supplier/customer relationships. Furthermore, it is difficult for a supplier to offer a CPU program that has the capability to alternate between different CPU allowance rate structures, so that the most appropriate structure is utilized for each load. For example, the allowance for a load that weighs out should not be determined using a cube basis rate structure. Lacking this capability, partner dyads resign themselves to choosing just one rate structure, and accepting its limitations.

Program Compliance and Performance: In CPU, the supplier cedes control for the shipment to the customer upon pick-up by the customer (or the customer's carrier) at the supplier's ship-from location, even though the supplier typically retains title until the goods are delivered. In so doing, the supplier implicitly assumes several risks, such as:

1) Diversion: The customer can, having accepted an allowance to deliver a shipment to a specific CDC, divert that shipment to another CDC. This action can affect the supplier's stock allocation planning process as the inventory records (by location) are now incorrect. There is also the possibility that the customer never intended to deliver to the agreed destination, especially if the cost of delivery to the diverted location is less than the cost of delivery to the agreed destination. Regardless, it is very difficult, if not impossible, for the supplier to verify that the shipment was delivered to the agreed location.

2) Late Delivery and Unloading: The customer's traffic manager (or dispatcher) might (knowingly or unknowingly) make decisions that compromise the on-time arrival and unloading of the CPU shipment. Pick-up delays result when the CPU carrier cannot or does not honor their volume commitment, which is most likely during shipping peaks created by promotional events. In such an event the supplier must convert the load from CPU to Delivered and scramble to secure a carrier, which may be difficult as the supplier probably does not consistently ship on that lane. Delays are then common. Shipments can also be delayed due to a "relay", where the trailer is handed off from one power unit to another, risking a delay on the transfer. Or, upon arrival, the CDC may choose not to promptly unload the trailer. At best, such events result in partner conflict over payment term compliance, as the supplier bases the payment due date on the assumed arrival (and unload) date, while the customer typically bases the payment date on the actual (and possibly later) unloading date. At worst, these delays result in an out-of-stock situation, and the supplier loses sales. In fact, it is for this reason that buyers in the FMCG market are known to complain about the poor on-time performance on CPU shipments delivered by their customer's private fleet or for-hire CPU carrier.

3) Enforcement: Needless to say, enforcement is challenging. First, the supplier can only measure on-time pick-up. It is then impossible for the supplier to reduce a discussion of on-time delivery to a fact basis. Even if the supplier could do so, they might be reluctant to because it might risk sales, especially for a strategic collaborative buyer/seller partnership. This is a simple consequence of the fact that customer is playing two roles—customer on the buy/sell of the goods, and provider (supplier) on the buy/sell of transportation services. The supplier typically defers to the customer role, and poor compliance on the CPU Program is ignored.

4) Financial Transaction Process: The standard terms of sale in the FMCG market is "Destination Delivered", meaning that title to the goods transfers from the seller to the buyer on receipt at the customer's receiving dock ("Destination") and that the transportation is arranged and paid for by the supplier ("Delivered"). Insofar as suppliers are often reluctant to quote an Origin Collect selling price, the standard industry practice is that suppliers offer customers who wish to pick-up their freight an "off-invoice" line item (i.e., credit) on the invoice for the goods in an amount agreed by buyer and seller. This credit is referred to as a "CPU allowance". Another practice, although less common, is for the customer to submit a freight bill to the supplier in the amount of the CPU allowance. Either way, the financial transaction is an exceptional business process, if not for the buyer than certainly for the seller, leading to confusion and failure. In addition, if the CPU Line Haul Cost is to be corrected for changes in fuel prices via a fuel adjustment, then the parties have to manage the additional complexity of changing the allowances on the agreed adjustment cycle (often weekly). For these reasons, many sellers simply refuse to offer the option of CPU because they are not confident of successfully managing the process complexity that CPU introduces to the freight payment financial transaction process.

Presently, there are no commercially available and practicable solutions that overcome these barriers and limitations, leaving consumer goods manufacturers and retailers (distributors) anxious and confused. A better solution is needed. Such a solution must not only address the barriers and limitations, but also must be:

1) Trusted: The solution's process must be sensible and fair, the rules pre-determined and enforced.

2) Robust: The solution must accommodate diversity at the strategic and tactical level.

3) Integrated and Systematic: The process by which the partners request and communicate CPU allowances must be integrated (one system serves all) and system-driven, preferably on the Internet.

4) Cheap and Easy to Use: The solution's process must be simple and intuitive, extendable with little incremental cost or effort, and inexpensive with no initial investment, so that all partners, regardless of size or capabilities, can participate.

BRIEF SUMMARY OF INVENTION

The present invention is a method and apparatus for effectuating collaboration on customer pick-up (also called backhaul) arrangements between one or many buyers and sellers (collectively called partners) in a supply community. The present invention enables sellers to create, configure, and maintain seller-specific CPU programs comprised of at least one CPU Strategy Option and at least one CPU Allowance Unit Rate Structure Option which can be contemporaneously accessed by one or many buyers to quickly and easily identify potential CPU opportunities and then submit a CPU Proposal/Request, each based on a single CPU Strategy Option, to one or many sellers, wherein the CPU Proposal/Request is either a Collaboration Invitation, a Supply Bid, or a Request for a Lane Allowance Quotation structured to facilitate the agreement of a mutually acceptable CPU Allowance Unit Rate consistent with the selected CPU Strategy Option. In a preferred embodiment, the apparatus of the present invention includes an internet-based program tool within which the seller can specify the rules used to select the most appropriate CPU Allowance Unit Rate Structure Option for calculating the CPU Allowance for a shipment and within which the seller can utilize the Gainshare Module to pay the buyer the agreed CPU Allowance for any CPU shipments.

Thus, there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In that respect, before explaining at least one embodiment of the invention in detail, it is to be understood that the invention is not limited in its arrangement of the components set forth in the following description and illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this development. It is important that the claims be regarded as including such equivalent methods and products resulting therefrom that do not depart from the spirit and scope of the present invention. The application is neither intended to define the invention of the application, which is measured by its claims, nor to limit its scope in any way.

Thus, the objectives of the invention set forth below, along with the various features of novelty which characterize the invention, are noted with particularity in the claims annexed to and forming a part of this disclosure. For a better understanding of the invention, its operating advantages and the specific results obtained by its use, reference should be made to the following detailed description taken in conjunction with the accompanying drawings wherein like characters of reference designate like parts throughout the several views.

The drawings are included to provide a further understanding of the invention and are incorporated herein and constitute a part of the specification. They illustrate embodiments of the invention and, together with their description, serve to explain the principles of the invention.

DETAILED DESCRIPTION OF THE INVENTION

Figure 1:
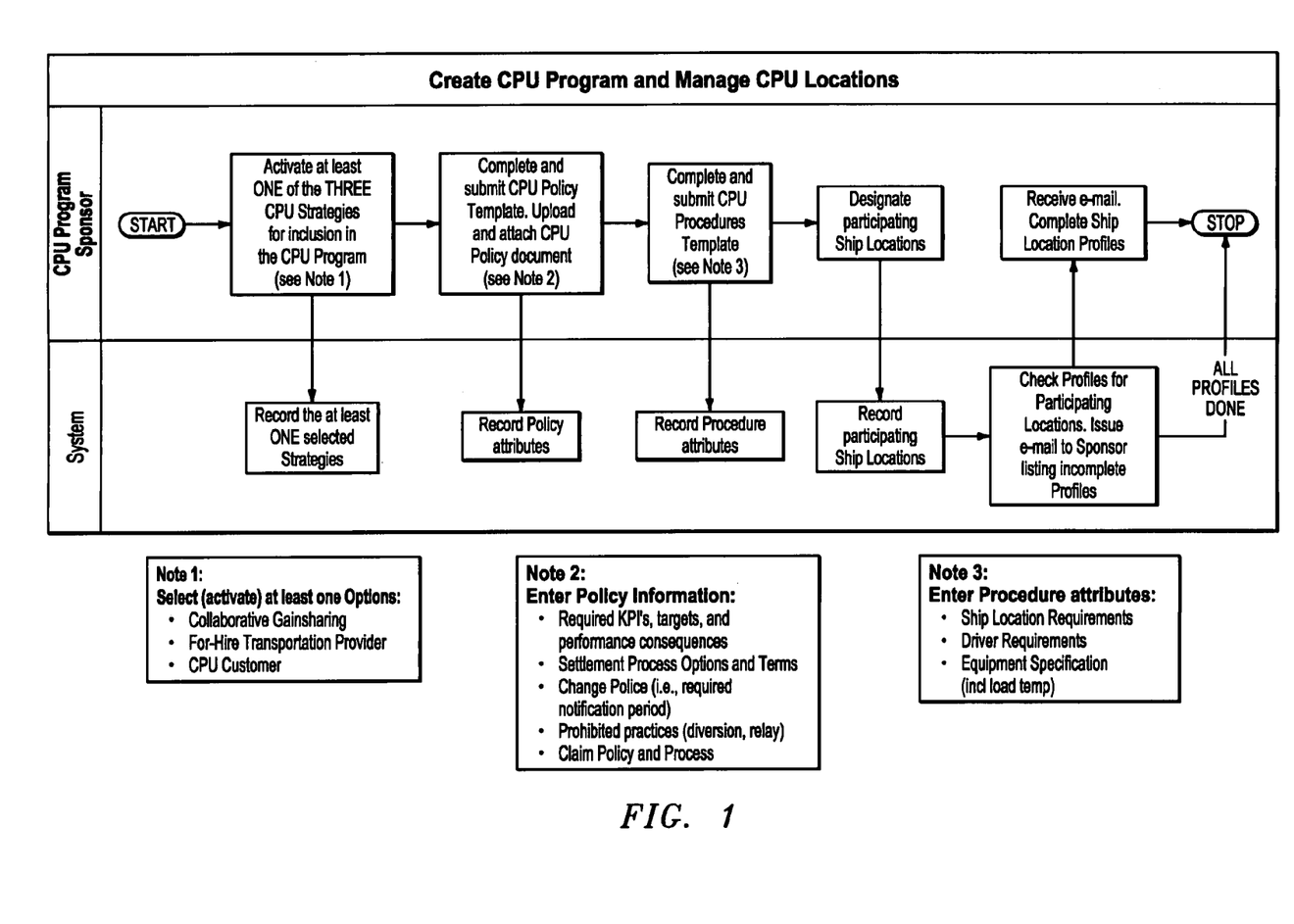
FIG. 1 is a block diagram illustrating the creation of a CPU Program wherein a Sponsoring Partner must specify or select (i) at least one CPU Strategy for inclusion in the Program, (ii) complete the CPU Program Policy and Procedure templates, and (iii) designate the Sponsor's Ship Locations that will participate in the CPU Program.

A supplier that desires to offer CPU as an option to its customers first creates a CPU Program by specifying attributes that enumerate their CPU strategy, policies, procedures (including shipment specification), and structure of the CPU Allowance Formula, and by designating which of their SDC shipping locations (city, state, and zip code) are available to participate in CPU, as shown in FIG. 1. In creating a CPU Program, the supplier becomes a CPU Program Sponsor. In this creation process step, the CPU Program Sponsor must make two key decisions.

First, the CPU Program Sponsor must decide which CPU strategies to offer to its customers. The invention can support any kind of strategic relationship structure. By way of example, three CPU Strategy Options that can be enabled in the invention are:

1) Collaborative Gainsharing: In this strategy option, the expected net combined cost savings for converting to CPU is shared between the two partners so that both earn a return on their efforts. This is accomplished by setting the CPU Allowance Unit Rate such that the net savings are shared equally (50/50 split default value) by the partners or in whatever Gainshare Allocation Factor ratio the partners agree to. "Open-book" cost information is disclosed to both partners for their review and acceptance.

2) For-Hire Transportation Provider: In this strategy option, the Sponsor is willing to consider and act upon supply proposals submitted by their customers to sell and provide transportation services. Such a customer typically wishes to improve the utilization of their carrier assets, be it a private fleet or a for-hire carrier, by reducing unfilled miles and is prepared to function as a for-hire carrier, preferably operate under a Standard Carrier Alpha Code (SCAC), and receive tenders and perhaps even to submit freight bills electronically. The CPU Allowance Unit Rate is based on whatever Line Haul Cost the partners negotiate in the context of a competitive marketplace, wherein the negotiation is initiated by the customer in their supply proposal.

3) CPU Customer: In this strategy option, the Sponsor is willing to provide, upon the request of a customer, an offer to buy transportation services from the customer, wherein the CPU Allowance Unit Rate offered by the Sponsor is calculated using the Sponsor's actual historical costs of delivery (Line Haul Cost and typical Accessorials). CPU Customers typically desire to improve the utilization of their carrier's assets, be it a private fleet or a for-hire carrier, by reducing unfilled miles, but are not prepared to function as a for-hire carrier; the customer does not intend to operate under a SCAC and expects to be paid by the application of a credit in the amount of the CPU Allowance on their invoice for the goods purchased from the Sponsor and delivered by the CPU carrier.

Accessorials are charges for services provided by the carrier on an "as-needed basis" in addition to the line Haul. Examples are: Live Load/Unload—driver is required to be present during loading or unloading; Detention—power unit is detained beyond the agreed loading/unloading time; and, Loading/Unloading—loading or unloading assistance provided by the driver or carrier's representative.

Figure 2:
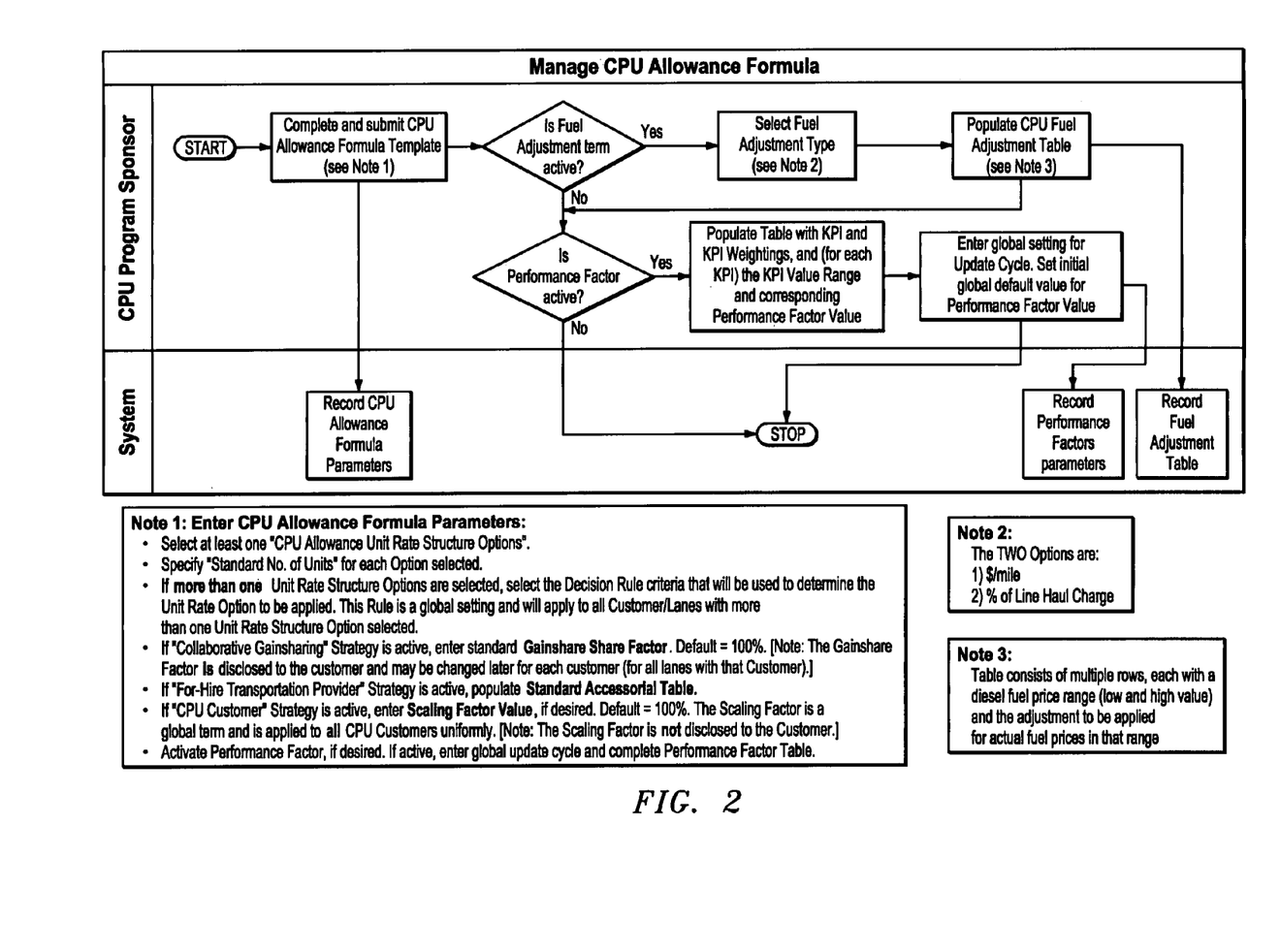
FIG. 2 is a block diagram illustrating the management of the Sponsor's CPU Allowance Formula wherein the Sponsor must select at least one CPU Allowance Unit Rate Structure Options and specify the Standard Number of Units for each Option selected, and enter the required CPU Allowance Formula parameters, such as the probably does not consistently ship on that lane. Delays are then common. Fuel Adjustment Term, the Scaling Factor, the Gainshare Allocation Factor, and the Performance Factor, as desired and the Decision Rule criteria that will be used to determine which Unit Rate Structure Option is to be used if the Sponsor has selected more than one Unit Rate Structure Option.

Secondly, the Sponsor then specifies the structure of the CPU Allowance Unit Rate and the values for each parameter in the CPU Allowance Formulae (see Table 1 and FIG. 2), as follows:

1) The Sponsor selects which one or more of the CPU Allowance Unit Rate Structure Options to use as the basis for their CPU Allowance Unit Rate Formula and enters the Standard No. of Units for each of the Options selected. The invention can support any rate structure, including all those presented in Table 1, provided that the transaction data for the selected units of measure is available and entered into the system. Furthermore, the supplier can select more than one CPU Allowance Unit Rate Option and then specify the decision rules that will be used to determine which one of the more than one selected CPU Allowance Unit Rate Options will be utilized to calculate the Rate and the CPU Allowance for a particular CPU shipment. By way of example, the CPU Allowance for a shipment of dense goods where the shipment size is constrained by the maximum legal shipping weight would be most appropriately determined using the Hundredweight Basis Rate Structure. Conversely, the CPU Allowance for a shipment the size of which is limited by the volume of the shipment container (i.e., low density goods) would be most appropriately determined using the Cube Basis Rate Structure. Examples of decision rules include: i) the default Option specified by Seller and Buyer for that lane, ii) the Option that maximizes the CPU Allowance, iii) the Option that minimizes the CPU Allowance, and iv) a Flat Rate Option (Purchase Order or Shipment) provided that any trailer utilization conditions such as weight, cube, or pallet count associated with that Flat Rate Option are fully satisfied.

2) The Sponsor may activate the Fuel Adjustment Term and select one from many rate structures, such as a per mile adjustment ($/mile) or a percent of cost (% of Line Haul Cost). Any structure can be supported by the invention, provided that the required information is available and entered. If the Sponsor chooses to activate the Fuel Adjustment Term, then the Sponsor must also specify the cycle (i.e., weekly) on which the Fuel Adjustment Term is to be updated.

3) If the CPU Sponsor selects the "CPU Customer" Strategy Option as one of the at least one Options, then the CPU Sponsor may choose to activate the Scaling Factor. The Scaling Factor inflates or deflates the CPU Allowance. The default value is 100%. Values less than 100% reduce the CPU Allowance, thereby compensating the CPU Sponsor for any consequential costs incurred by implementing CPU (such as higher transportation rates due to reduced volume leverage, unbalanced lanes, or increased process complexity) or simply sharing back to the CPU Sponsor a portion of the savings realized by the customer via CPU. Values higher than 100% increase the CPU Allowance, a useful mechanism if the CPU Sponsor is unable to attract sufficient transportation capacity at the required performance level. So as to comply with the Robinson-Patman Act, the intent is that a single value of Scaling Factor is selected and applied to all customers uniformity.

4) The Sponsor may also choose to activate the Performance Factor, which serves to increase or decrease the CPU Allowance in accordance with the CPU Sponsor's Performance Factor Values Table and the CPU carrier's actual performance. The default value is 100%. Values less than 100% penalize the CPU customer for poor performance, while values greater than 100% reward the CPU customer for excellent performance. Accordingly, the Performance Factor is customer specific, based on quality key performance indicators, and reviewed and adjusted, as appropriate, on a specified cycle by the Sponsor.

5) The CPU Sponsor enters the Gainshare Allocation Factor if the Sponsor selected the Collaborative Gainsharing as one of the CPU Strategy Options. The default value is 100%. A Factor of 0% allocates none of the net combined savings to the customer. Conversely, a Factor of 100% allocates all of the savings to the customer.

Figure 3:
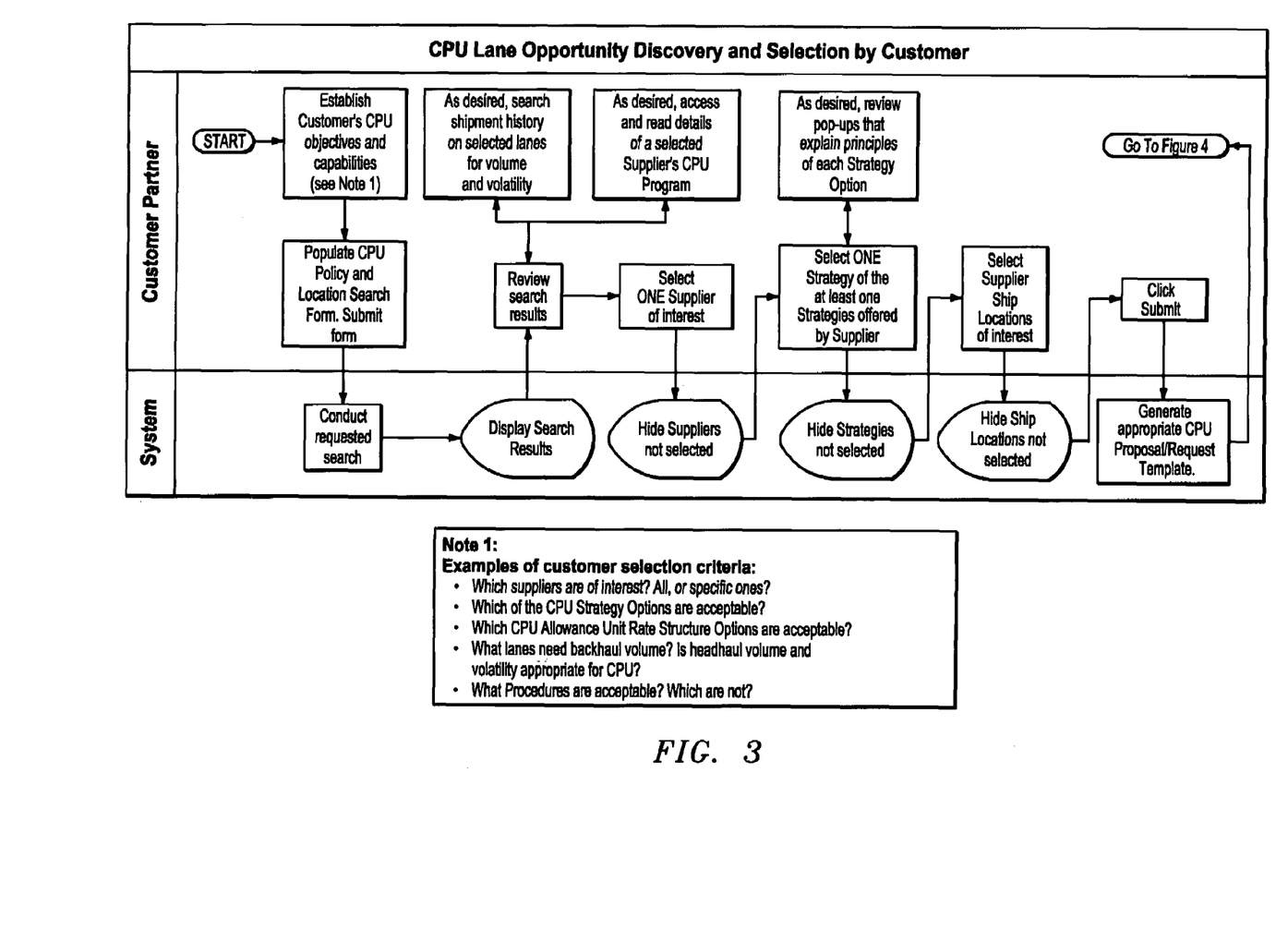
FIG. 3 is a block diagram illustrating the discovery of potential CPU opportunities by a customer (a potential CPU program participant) wherein the customer searches the Sponsors' CPU Program and Location database to identify promising opportunities, and then submits, to a selected Sponsor, a CPU Proposal/Request based on just one of the CPU Strategies included by that Sponsor in its Program.
Figure 4:
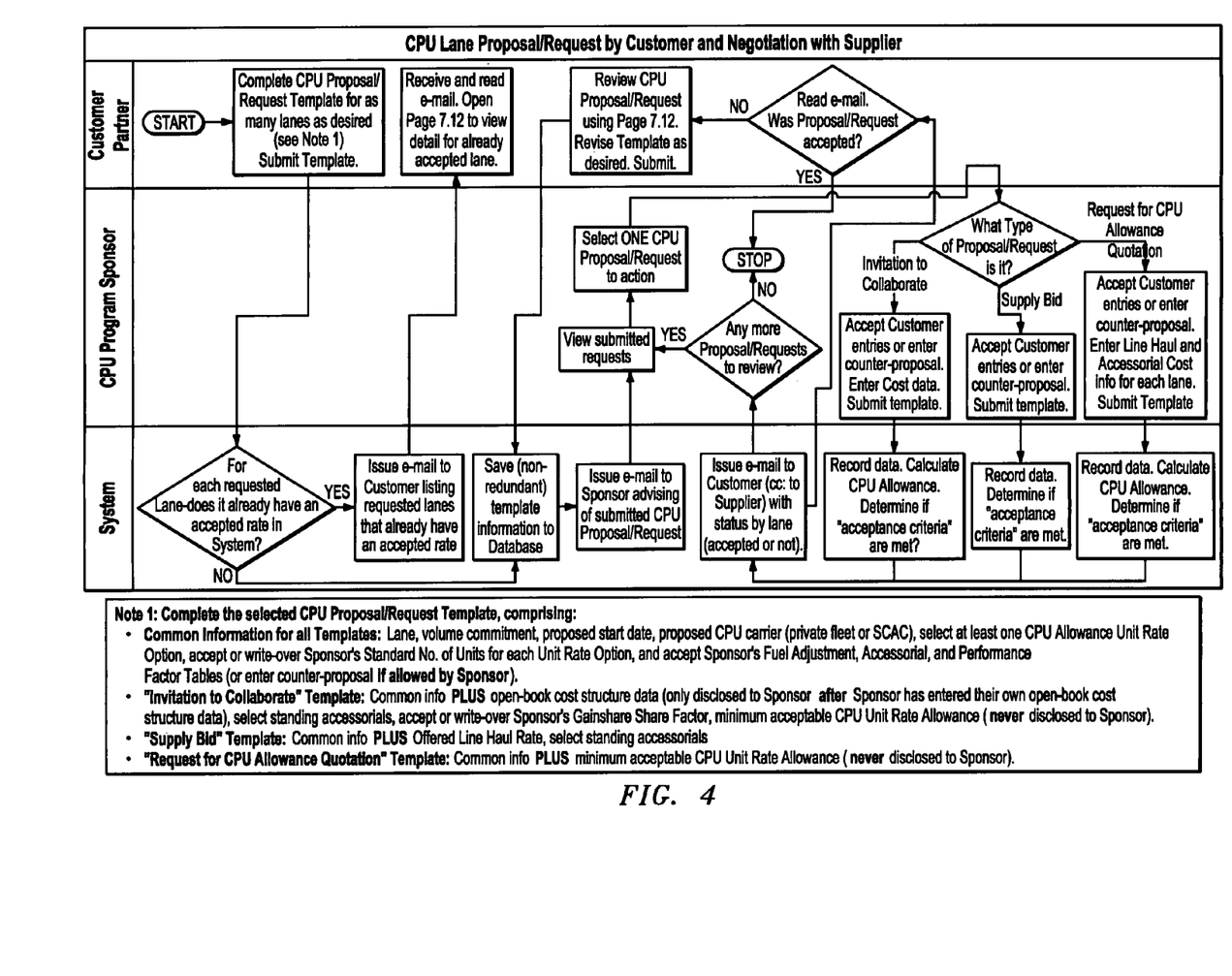
FIG. 4 is a block diagram illustrating the determination and negotiation of CPU Allowances by the Customer and the Sponsor wherein the process by which the CPU Allowance for a lane is established is determined by the type of CPU Proposal/Request submitted by the Customer to the Sponsor.

Referring now to FIGS. 3 and 4 (Opportunity Discovery and Negotiation), a customer that is interested in discovering and evaluating CPU opportunities with their suppliers can at anytime query the CPU Programs and Locations Databanks to identify suppliers that offer CPU programs and have Ship Locations that meet the customer's search criteria. Upon identifying promising sponsors and locations, the customer can drill into the Appointment Making Module to access historical data for shipments from that Sponsor's DC Location to their corresponding receiving DC Location to obtain shipment volume, volatility, and trailer utilization (average weight, pallet count, or cube). The evaluation of these highest-potential lanes is initiated when the customer submits a CPU Proposal/Request, selected from the following three Options, to the CPU Program Sponsor, as follows. The request is only submitted if the customer has accepted the Sponsor's CPU Policy and Procedure Agreement.

1) An Invitation to Collaborate in which the customer submits the information is included as a part of FIG. 4. The Sponsor responds to the invitation by submitting their current actual cost-of-delivery structure (comprised of the line haul, fuel adjustment, and accessorials, at both origin and destination, as relevant), any consequential costs that the Sponsor can reasonably expect to incur if CPU were implemented, the maximum CPU Allowance Unit Rate Maximum Limit that the Sponsor would accept, and accepts or overwrites the Standard Number of Units proposed by the customer. The CPU Allowance Unit Rate is then calculated using the Sponsor's Gainshare Allocation Factor. If the calculated CPU Allowance Unit Rate is greater than the customer's Minimum limit and less than the Sponsor's Maximum Limit, then both partners can view the CPU Allowance and all the cost information (but not the acceptance limits). If the disclosed cost information is acceptable to both partners, then the partners can each accept the CPU Allowance Unit Rate and the Standard Number of Units, and then plan and execute the transition to CPU.

2) A Supply Bid in which the customer submits the information presented is also included as a part of FIG. 4. The Sponsor is free to accept or reject the bid, or submit a counterproposal to the customer. Standing accessorials (i.e., accessorials that will be incurred on every CPU shipment for a specific lane) can be included in the CPU Allowance Unit Rate. An accessorial schedule is also agreed for unplanned accessorials, if necessary. Note that no underlying cost-structure information is disclosed. The CPU Allowance Unit Rate for each CPU lane is determined by entering the negotiated Line Haul Cost, Fuel Adjustment Term, agreed standing accessorials, and the Standard No. of Units into the Sponsor's CUP Allowance Unit rate Formula, with the Gainshare Share Factor and the Scaling Factor both set at this default value of 100%.

3) A Request for a CPU Allowance Quotation in which the customer submits the information is also included as a part of FIG. 4. The Sponsor is then required to submit a CPU Allowance Unit Rate for each requested lane to the customer, which is calculated using the CPU Allowance Unit Rate Formula and lane-specific information (average line haul rate, historical accessorial cost at the origin and destination, and historical performance) entered by the Sponsor. If the CPU Allowance quoted by the Sponsor is greater than the customer's CPU Allowance Unit Rate Minimum Limit, then the Allowance is automatically accepted by both partners. Otherwise, the quoted CPU Allowance is automatically rejected. The customer can, if they wish, submit another request with a lower minimum CPU Allowance Unit Rate Minimum limit.

In all three options above, the historical data for shipments on the subject lane—shipment volume, volatility, and trailer utilization (average weight, pallet count, or cube), as available—are systematically populated into the CPU Proposal/Request document.

In any of these three options above, the customer can simultaneously submit a CPU Proposal/Request to more than one Sponsor with the intention of consolidating more than one order on a single shipment by picking up less then full truckload orders at more than one location. The customer would thereby be combining at least two partial loads into a more full truckload shipment. The customer would be accountable for planning the shipments so that the multiple pick-ups do fit in the one trailer and for synchronizing requested pick-up dates and times so that the shipment is feasible.

Having successfully concluded the discovery and negotiation process step by entering into a definitive agreement with a CPU Program Sponsor, the customer becomes a CPU Customer. The details of the agreement are captured in CPU Lanes Database including the CPU Customer, CPU Program Sponsor, lane Origin Location(s) and Destination Location pair, historical volume, CPU carrier volume commitment, CPU Allowance Unit Rate Option, Standard Number of Units, CPU Allowance Unit Rate value, standing accessorials (if any), Gainshare Allocation Factor (if any), and Performance Factor (default=100%). CPU Customers and Sponsors may query their information for any of their partners at any time. They may also download data extracts to facilitate the entry of the necessary data into their legacy transaction system(s). The partners then plan and execute the transition from delivered to CPU. The partners are required to use the Appointment Making method and system disclosed in companion patent application Ser. No. 10/775,680. This ensures that the data required by the CPU Allowance Formula calculations is available.

Figure 5:
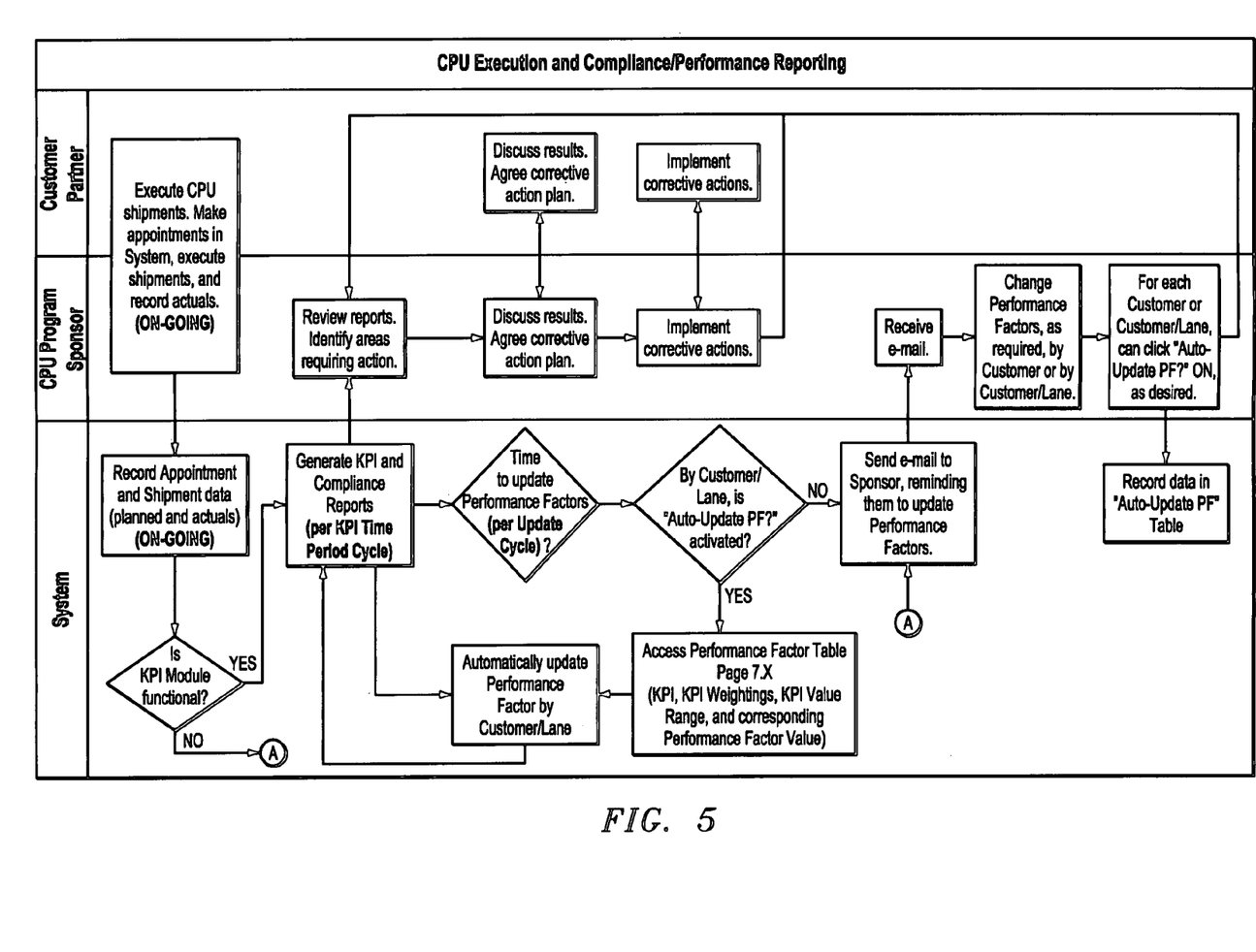
FIG. 5 is a block diagram illustrating the execution of CPU shipments, and the reporting required by the Sponsor to enforce compliance on key performance standards (KPI's) and policy compliance, wherein the Sponsor can change the Performance Factor for a specific CPU Program Participant as appropriate to reward or penalize performance.

The CPU Customer and Sponsor generate and monitor Performance Reports for the Ship Locations and for the CPU Carrier, such as On-Time Pick-Up, On-Time Delivery, and On-Time Unloading. The KPI data is used to update the Performance Factor in the CPU Allowance Formula, if activated, according to the Performance Factor Values Table. In addition, the Sponsor can monitor the CPU customer's compliance to any policy requirements in the Sponsor's Program. For example, the Sponsor can monitor the destination location records for each shipment to identify instances of diversion. Or, the Sponsor can compare the identification number of the power unit used to pick-up the CPU shipment to the identification number of the power unit that delivered that same shipment. If different, the CPU customer's carrier made a power transfer (relay shipment). The Sponsor can then discuss the findings with the CPU customer to determine if the Sponsor's CPU Policy was violated and make changes to the Performance Factor for that CPU customer, as appropriate to reward excellent performance or penalize poor performance.

Figure 6:
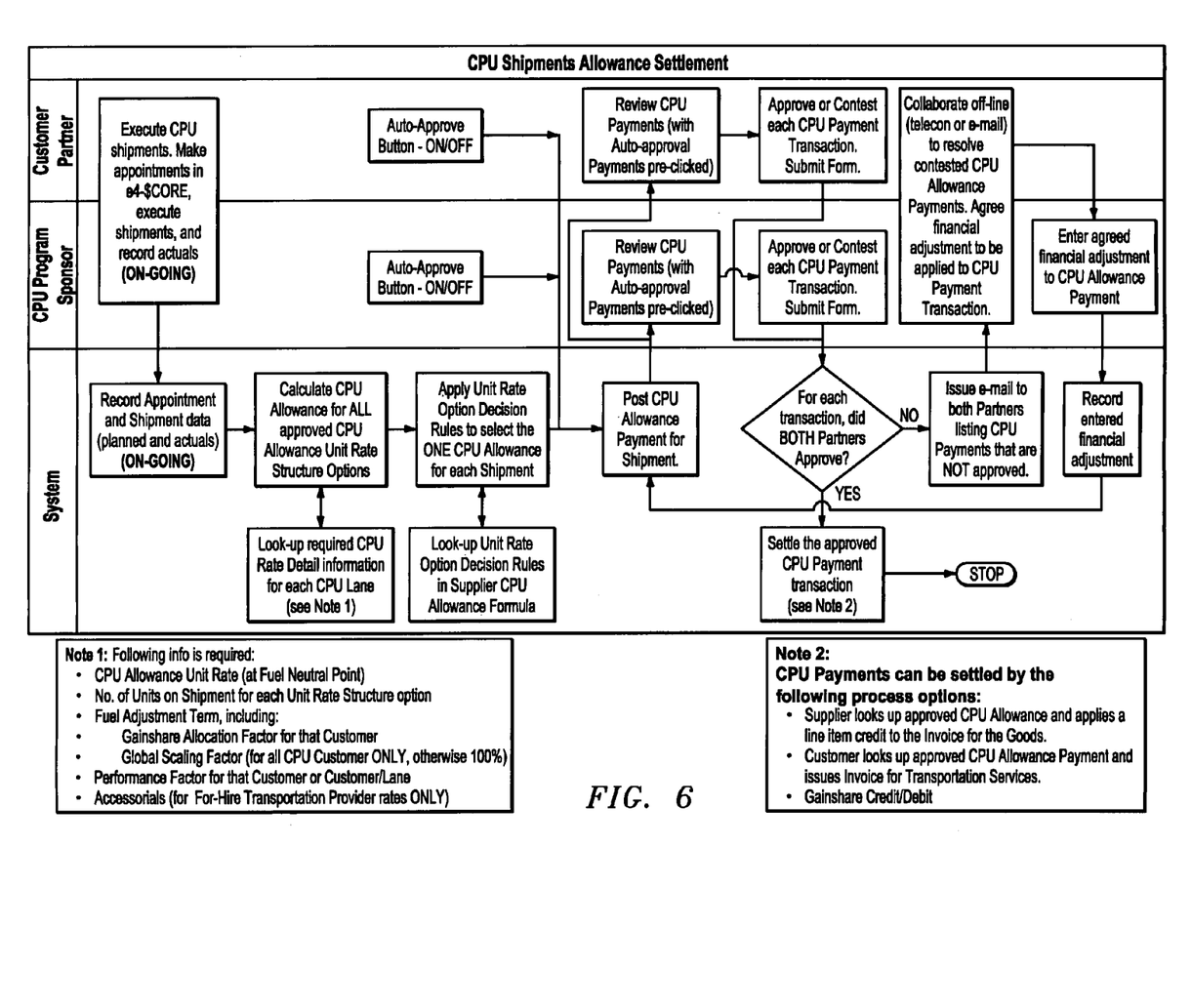
FIG. 6 is a block diagram illustrating the settlement of CPU shipments wherein the CPU Allowance for a particular shipment is calculated using the CPU Allowance Units Rate option selected according to the criteria specified by the CPU Sponsor, the Partners approve the payment, and the payment is effected by one of three options, including the use of the Gainshare Module.

The payment of the CPU Allowance can be effected by any of several business processes. The CPU Sponsor can apply an "off-invoice" line item credit to the CPU Customer's invoice in the amount of the CPU Allowance. This is effective, unless the goods on a single shipment are invoiced using multiple invoice documents, in which case the CPU Allowance credit must be allocated across the multiple invoice documents. Alternately, the CPU customer can submit a freight bill in the amount of the CPU Allowance to the CPU Sponsor for payment. This also is effective, but may not be feasible for many customers. Finally, the Gainshare process disclosed in the Gainshare Module referred to previously can be used effectively to settle the charge for the CPU shipment. The Gainshare process determines the net CPU credit due the CPU Customer by aggregating the CPU Allowance payable for each CPU shipment. Invoices are then issued to the Sponsor and payments are made to the Customer.

As shown in FIG. 6, any CPU Allowance Unit Rate Structure Option included by the CPU Sponsor and CPU customer on a particular lane can be used for any shipment on that lane, as selected by the decision rules specified by the Sponsor applied to the shipment attribute values (weight, cube, and pallet count) entered in the appointment making process. A CPU Allowance Unit Rate of one (default) Unit Of Measure (UOM) type can be easily converted to the equivalent CPU Allowance Unit Rate of another UOM type by multiplying the Rate by the ratio of the Standard Number of Units for the default UOM divided by the Standard Number of Units for the other UOM. Furthermore, the Line Haul Cost component of the CPU Allowance Unit Rate Formula is automatically updated for changes in the Fuel Adjustment Term on the cycle selected by the Sponsor. The partners can choose to manually review each transaction (payment of or credit for CPU shipments), or activate the auto-approve feature.

The method disclosed herein, and especially the use of the CPU Allowance Formulae presented in Table 1, is better understood by way of some examples, informational Tables 2 and 3 for which are as follows.

TABLE 1

CPU Allowance Formulae and Unit Rate Structure Options $$\text{CPU Allowance Unit Rate (\$/UOM)} = \frac{\text{(Gainshare Allocation Factor)} \times \{(\text{Scaling Factor}) \times [(\text{Line Haul Cost}) + (\text{Fuel Adjustment Term})] + \text{Accessorials}\}}{(\text{Standard No. of Units})}$$

$$\text{CPU Allowance (\$)} = (\text{Performance}) \times [(\text{CPU Allowance Unit Rate}) \times (\text{No. of Units on Shipment})]$$

| Attribute | Options | Customer View | Supplier View |
|---|---|---|---|
| "CPU Allowance Unit Rate" Structure Options | Hundredweight Basis ($/cwt) Unit of Measure (UOM) = hundred lbs Std No. of Units = 450 ct (45,000 lbs) | Acceptable for heavy goods that weigh out, should be based on as shipped weight | Incentivizes customer to maximize shipment weight, more complex as rate must be extended by No. of Units on Shipment to calculate CPU Allowance |
| (with examples of values for "Standard No. of | Cube Basis ($/cubic feet) UOM = cubic feed Standard No. of Units = | Preferred for light-weight goods that cube out, should be based on shipped volume | Incentivizes customer to maximize shipment cube, more complex as rate must be extended by No. of Units on |

TABLE 1-continued

CPU Allowance Formulae and Unit Rate Structure Options $$\text{CPU Allowance Unit Rate (\$/UOM)} = \frac{\text{(Gainshare Allocation Factor)} \times \{(\text{Scaling Factor}) \times [(\text{Line Haul Cost}) + (\text{Fuel Adjustment Term})] + \text{Accessorials}\}}{(\text{Standard No. of Units})}$$

$$\text{CPU Allowance (\$)} = (\text{Performance}) \times [(\text{CPU Allowance Unit Rate}) \times (\text{No. of Units on Shipment})]$$

| Attribute | Options | Customer View | Supplier View |
| --- | --- | --- | --- |
| Units" for 53' trailers) | 3830 cubic feed | | Shipment to calculate CPU Allowance |
| | Pallet Basis ($/pallet count) UOM = pallets Standard No. of Units = 24 pallet spots | Preferred for light goods that cannot be stacked, should be based on shipped pallet count | Incentivizes customer to maximize shipment pallet count, more complex as rate must be extended by No. of Units on Shipment to calculate CPU Allowance |
| | Invoice Value Basis UOM = thousand dollars Standard No. of Units = 50 k$ Flat rate per PO UOM = PO count Standard No. of Units = 1 [Optional: Minimum weight, cube, or pallet count requirement] | Easiest, no product understanding required, but not aligned with actual costs Difficult if PO's must be combined to achieve threshold criteria | Not aligned with actual costs, ineffective if load value vary significantly Requires enforcement of minimum weight, cube, or pallet count requirement |
| | Flat rate per Shipment UOM = Shipment Container Standard No. of Units = 1 [Optional: Minimum weight, cube, or pallet count requirement] | Many customer systems are based on PO (not on shipment), assumes risk of supplier cuts | Requires enforcement of minimum weight, cube, or pallet count requirement, may constitute disclosure of confidential rate information |
| Fuel Adjustment Term | None | Causes cyclical changes in variances, would request right to deduct the fuel adjustment | Simplest option, cycles neutralize in longer-term |
| | Cts/mile adjustment above/below the neutral point Adjustment = (adjustment cts/mile) × (trip miles) | Complex (requires trip mileage), prefer favorable adjustment only (no adjustment when below neutral point) | Complex (requires trip mileage), prefer symmetrical adjustment |
| | % of allowance adjustment above/below the neutral point Adjustment = (adjustment %) × (Line Haul Cost) | Preferred option, prefer favorable adjustment only (no adjustment when below neutral point) | Prefer symmetrical adjustment |
| Aceessorials | None | Acceptable for drop shipments no accessorial is paid) | Simple, penalizes inefficient practices (as |
| | Loading and unloading accessorials, such as typical detention, and driver unloading, counting, and sort and segregation | Preferred for live loads, complex unless simplified to one standard accessorial schedule. | Rewards inefficient customers, complex unless use suppliers standard accessorial schedule |
| Performance Factor | Factor that reduces Cpu Allowance if performance is significantly below average. Default Value = 100% | Understood, but probably viewed as low risk due to enforcement difficulty | Complex, difficult to enforce |
| Gainshare Allocation Factor | For Collaborative Gainshare Strategy ONLY. Factor that allocates the net combined cost savings between the two parties. Default Value = 100% GAF = 0% allocates NONE of the net savings to the customer GAF = 100% allocates ALL of the savings to the customer. | | |
| Scaling Factor | For CPU Customer Strategy ONLY. Factor that increases or decreases the CPU Allowance as specified by the Sponsor. Default Value = 100% SF < 100% compensates supplier for consequential costs incurred by supplier SF > 100% helps a supplier with insufficient capacity to attract additional CPU capacity. | Understands reason for term, but does introduce complexity. | A useful tool, creates flexibility |

TABLE 2

Examples

|  | Example 1 | Example 2 | Example 3 | Example 4 | Example 5 |
|---|---|---|---|---|---|
| Unit Rate Option (Units Of Measure) | Hundred wgt Basis (cwt) | Cube Basis (cubic feet) | Pallet Basis (pallet count) | Invoice Value Basis (thousand $, or k$) | Flat rate per Shipment (shipment count) |
| Gainshare Allocation Factor | 100% (Default value) | 100% (Default value) | 100% (Default value) | 100% (Default value) | 100% (Default value) |
| Scaling Factor | 100% (Default value) | 100% (Default value) | 100% (Default value) | 100% (Default value) | 100% (Default value) |
| Line Haul Cost | $1000 | $1000 | $1000 | $1000 | $1000 |
| Fuel Adjustment Term | $0 | $0 | $0 | $0 | $0 |
| Accessorials | $0 | $0 | $0 | $0 | $0 |
| Standard No. of Units | 350 cwt (35,000 lbs) | 1915 cubic feet (single stacked) | 24 pallet spots | $50 k$ | 1 shipment |
| CPU Allowance Unit Rate | $2.857 per cwt | $0.479 per cubic foot | $41.67 per pallet | $20 per k$ | $1000 per shipment |
| Actual No. of Units on Shipment | 370 cwt | 1755 cubic feet | 22 pallets | 40 k$ | 1 shipment |
| Performance Factor | 100% | 100% | 100% | 100% | 100% |
| CPU Allowance for actual shipment | $1057 | $840 | $917 | $800 | $1000 |

TABLE 3

Additional Examples

|  | Example 6 | Example 7 | Example 8 | Example 9 | Example 10 |
|---|---|---|---|---|---|
| Unit Rate Option (Units Of Measure) | Hundredwgt Basis (cwt) | Cube Basis (cubic feet) | Pallet Spots Basis (pallet spot count) | Invoice Value Basis (thousand $, or k$) | Flat rate per Shipment (shipment count) |
| Gainshare Allocation Factor | 100% (Default value) | 100% (Default value) | 100% (Default value) | 100% (Default value) | 100% (Default value) |
| Scaling Factor | 70% | 70% | 70% | 70% | 70% |
| Line Haul Cost | $1000 | $1000 | $1000 | $1000 | $1000 |
| Fuel Adjustment Term | 105% | 105% | 105% | 105% | 105% |
| Accessorials | $50 | $50 | $50 | $50 | $50 |
| Standard No. of Units | 350 cwt (35,000 lbs) | 1915 cubic feet (single stacked) | 24 pallets spots | $50 k$ | 1 shipment |
| CPU Allowance Unit Rate | $2.243 per cwt | $0.375 per cubic foot | $32.71 per pallet spot | $15.70 per k$ | $785 per shipment |
| Actual No. of Units on Shipment | 300 cwt | 3830 cubic feet | 24 pallet spots | 80 k$ | 1 shipment |
| Performance Factor | 110% | 110% | 110% | 110% | 110% |
| CPU Allowance for actual shipment | $740 | $1581 | $863 | $1381 | $863 |

Examples 1 through 5 (Tables 1 and 2): In these examples, a CPU Sponsor and its Customer have agreed an Allowance of $1000 for a Lane using the "CPU Allowance" Strategy option with all other parameters set at the defaults values of 100% or $0. The Partners selected the five CPU Allowance Unit Rate Options shown, each with its specified Standard No. of Units, resulting in the five CPU Allowance Unit Rates shown. An actual CPU Shipment, having the actual shipment attributes shown (clearly dense, less expensive goods that cannot be double stacked), is then executed. The CPU Allowance for this actual CPU Shipment ranges from a low of $840 (cube basis) to a high of $1057 (hundredweight basis). If the CPU Sponsor had selected the Unit Rate Option Decision Rule of "choose Option that maximizes the Allowance", the Customer would be paid $1057 for the shipment.

Examples 6 through 10 (Tables 1 and 3): In these examples, the scenario is the same as in Examples 1 though 5, except that the CPU Sponsor has set the Scaling Factor at 70%, has historically paid $50 per shipment for accessorials, and fuel is now more expensive than the neutral point (yielding a Fuel Adjustment Term of 105%). They then execute an actual shipment containing low density, expensive goods that can be double stacked. This maximizes cube utilization and earns the Customer a maximum CPU Allowance of $1581 for the shipment.

The Customer Pick-Up Program of the present invention can be incorporated in an internet web-site application which will enable business Partners in the truckload transportation marketplace (shippers, consignees and carriers) collaboratively to: (a) create and manage CPU Programs, (b) make and confirm pick-up and delivery appointments for truckload shipments, (c) record and share key transactional data, including accessorials incurred and proof-of-delivery documents, (d) measure and improve performance on key service and cost performance indicators, and (e) create and manage incentive programs that reward business partners for meeting threshold targets on the key performance indicators.

Such an internet web-site application is preferably modular in design with each module comprised of a narrow set of related capabilities and independent of the other modules (sharing only a common administration module and an underlying data base). This modular design reduces complexity, simplifies development and maintenance, and ensures reliability.

The modular design also helps ensure that the application, and its capabilities are intuitive and easy to use, so as to encourage adoption and consistent use by all individuals. Users will also be provided data entry options—a template (enter data into fields), manual Excel file uploads (or paste and copy), and an automated transfer server-to-server—to ease integration with current systems, regardless of business practice or process.

The structure for the modules is as follows:

1. Customer Care Module: This module welcomes visitors and invited guests to the web-site, communicates the vision and program, and then provides the information that the prospective member will want and need to make their decision to join (such as site tours, sample program and reports, press releases and articles, and customer testimonials). After completing the registration process and selecting the desired services, the member is then cared for with information (news letters, bulletin board and market updates), communication tools (buttons to e-mail the administrator, submit improvement ideas or touch a partner), and training tools (frequently asked questions, learning tutorials, and Help!). Partner administrators are also able to manage their account and archive data.

2. Master Data Entry and Management Module: Each member partner must enter and maintain its administrative data. First, the partner designates an administrator, who then configures and assigns roles to users at that partner. The administrator then creates a partner list naming those partners with whom they wish to collaborate. Each shipper and customer (consignee) must complete the ship location profile for every ship location. This profile records the information required by shippers and carriers to flawlessly plan and execute a shipment. The information is easily accessed and searched, and is maintained by the user responsible for that location. The location user configures the appointment schedule for that location in the appointment engine (for inbound and outbound shipments, as relevant). This schedule can be customized or changed to meet the needs of that location. Carriers complete a request for information survey that documents their capabilities. This information will be used by shippers to identify the carriers with the potential to offer the highest value against the shipper's needs.

3. CPU Program Creation and Management Module: This module enables a supplier to create a CPU Program via a Program Wizard. Customers can then search the database of CPU Programs to identify programs and locations that meet their CPU needs and interests. The module then structures the exchange of cost information and proposals to assist the partners to evaluate opportunities and agree on CPU Allowance terms. Data management and compliance tracking capabilities are also provided.

4. Enter and Maintain Transactions Appointments Module: This module is the data warehouse where the data that drives the performance and incentive modules is entered and managed. Here, CPU customers and their carriers request pick-up and deliver appointments by using the appointment engine and the location then confirms the appointment. Actuals for each shipment (against the planned appointments) are entered, by both the carrier and the location to ensure accuracy. Using an accessorial validation tool, the carrier and location independently indicate which accessorials were provided by the carrier while at the location. The shipper can then access or download this accessorial history to investigate discrepancies and to approve accessorials invoiced by the carrier. The carrier can scan and post proof of delivery documents for later use by the shipper to resolve deduction claims made by the customer.

5. Performance and Compliance Module: This module is a data analysis engine that generates score card reports of the performance of each participating partner as compared to the minimum required performance level for each key performance indicators. Users can also drill down through the data to determine the root cause of any key performance indicator deviations against the required performance level. Examples of key performance indicators are: (a) on-time by location (versus appointment), (b) power dwell time by ship location and, (c) trailer dwell times (turns) by drop location. This module is effective for monitoring compliance of the CPU customer to the CPU Sponsor's Program Policy and Procedure.

6. Gainshare Incentive Program Creation and Management Module: In this module, member partners can create and manage their own incentive program(s). This module is also effective for the settlement of CPU Allowance credits calculated via the selected Line Haul Rate Structure algorithm.

7. Account Management Module: In this module, the monthly financial statement for each partner is generated and posted. Receivables are invoiced and payments are issued for earned incentives. The partner administrator can review the account and approve each credit or debit to the account.

From the proceeding description, it can be seen that a CPU program creation and management method and system has been provided that will meet all of the advantages of prior art programs and offer additional advantages not heretofore achievable. With respect to the foregoing invention, the optimum functional and dimensional relationship to the parts of the invention including variations in format, material, shape, form, function, and manner of operation, use and assembly are deemed readily apparent to those skilled in the art, and all equivalent relationships suggested in the drawings and described in the specification are intended to be encompassed herein.

The foregoing is considered as illustrative only of the principles of the invention. Numerous modifications and changes will readily occur to those skilled in the art, and it is not desired to limit the invention to the exact operation shown and described. All suitable modifications and equivalents that fall within the scope of the appended claims are deemed within the present inventive concept.

What is claimed is:

1. A computer program product comprising a computer readable medium having computer readable program code embodied thereon and configured to control a computer to perform the method of:

a seller creating a customer pick-up program by selecting at least one customer pick-up program strategy option, selecting at least one customer pick-up program allowance unit rate structure option, and selecting decision rules by which a customer pick-up program allowance unit rate structure option is selected to determine a customer pick-up program allowance for a single shipment, wherein the step of seller creating a customer pick-up program comprises entering attribute data including customer pick-up program strategy, policy, procedures, and shipping location profiles the seller providing information for at least one seller shipping location;

a buyer selecting one of the at least one customer pick-up program strategy options selected by the seller and submitting a customer pick-up program proposal and request to the seller, wherein the customer pick-up program proposal and request is determined based on the selected program strategy option;

the buyer and seller selecting a determined customer pick-up allowance unit rate and at least one customer pick-up program allowance unit rate structure option for each customer pick-up program allowance; and determining the customer pick-up program allowance for a specific shipment using the selected customer pick-up allowance unit rate structure option, wherein the customer pick-up (CPU) allowance for the specific shipment is determined by the formulae:

$$CPU \text{ Allowance Unit Rate } (\$/UOM) =$$
$$\frac{(\text{Gainshare Allocation Factor}) \times \{(\text{Scaling Factor}) \times [(\text{Line Haul Cost}) + (\text{Fuel Adjustment Term})] + \text{Accessorials}\}}{(\text{Standard No. of Units})}$$

$$CPU \text{ Allowance } (\$) = (\text{Performance Factor}) \times$$
$$[(CPU \text{ Allowance Unit Rate}) \times (\text{No. of Units on Shipment})].$$

2. The computer program product as claimed in claim 1 wherein the at least one customer pick-up program strategy option selected by the seller is from the group of options including collaborative gainsharing, for-hire transportation provider, and customer pick-up customer options.

3. The computer program product as claimed in claim 2 wherein the collaborative gainsharing customer pick-up program strategy option comprises a gainshare allocation factor by which a net cost savings is allocated between the partners, the net cost savings being within the range of 0% with no allocation to the buyer and 100% with a total allocation to the buyer.

4. The computer program product as claimed in claim 2 wherein payment of the customer pick-up allowance is effected using an option selected from the group of options including an off-invoice line item credit in an amount corresponding to the customer pick-up program allowance, a freight bill in an amount corresponding to the customer pick-up program allowance and use of a gainshare module to credit the buyer and debit the seller in the amount of the customer pick-up allowance.

5. The computer program product as claimed in claim 1 wherein the at least one customer pick-up program allowance unit rate structure option is selected by the seller from a group of options including hundredweight basis ($/cwt), cube basis ($/cubic feet), pallet basis ($/pallet count), flat rate per purchase order basis ($/purchase order), flat rate per shipment basis ($/shipment), and percentage of invoice basis (% of invoice $ value).

6. The computer program product as claimed in claim 1 wherein a single decision rule is used to select the just one customer pick-up program allowance unit rate structure to be applied to a single shipment, the decision rule being selected from the group including a default option specified by seller and buyer, an option that maximizes the customer pick-up program allowance, the an option that minimizes the customer pick-up program allowance, and a flat rate option.

7. The computer program product as claimed in claim 1 wherein the buyer identifies potential customer pick-up program opportunities by using criteria options selected from the group of criteria options including customer pick-up program strategy, policy, procedures, customer pick-up allowance formulae, shipping location and profiles, and shipment volume and volatility.

8. The computer program product as claimed in claim 1 wherein payment of the customer pick-up program allowance from seller to buyer is approved by using an option selected from the group of options including a manual review and approval by the seller of each customer pick-up program allowance and a systematic and automatic approval of each customer pick-up program allowance.

9. The computer program product as claimed in claim 1 wherein the buyer submits a customer pick-up program proposal and request to more than one customer pick-up program sponsor to consolidate more than one order on a single shipment and thereby pick up less then full truckload orders at more than one location.

10. The computer program product as claimed in claim 1 wherein the customer pick-up program allowance unit rate comprises a line haul charge component that is from time to time updated for changes in a fuel adjustment term as specified by the seller.

11. The computer program product as claimed in claim 1 wherein the buyer and seller are within the same corporate entity.

12. The computer program product as claimed in claim 1 wherein the buyer reviews the customer pick-up program and location information to identify sellers and seller shipping locations that may be potential customer pick-up program opportunities.

13. The computer program product as claimed in claim 1 wherein the scaling factor is between 0 and any positive number.

14. The computer program product as claimed in claim 1 wherein the performance factor is between 0 and any positive number.

15. The computer program product as claimed in claim 1 wherein the fuel adjustment term is less than 0, greater than 0, and 0.

16. The computer program product as claimed in claim 1 wherein the accessorials is less than 0, greater than 0, and 0.

17. The computer program product as claimed in claim 1 wherein the buyer submits a customer pick-up program and request to seller.

* * * * *